(12) United States Patent
Chang

(10) Patent No.: US 10,421,317 B2
(45) Date of Patent: Sep. 24, 2019

(54) VISIBLE SPRING-BIASED CASTOR ASSEMBLY

(71) Applicant: Wen-Chen Chang, Changhua (TW)

(72) Inventor: Wen-Chen Chang, Changhua (TW)

( * ) Notice: Subject to any disclaimer, the term of this patent is extended or adjusted under 35 U.S.C. 154(b) by 38 days.

(21) Appl. No.: 15/701,490

(22) Filed: Sep. 12, 2017

(65) Prior Publication Data

US 2019/0077193 A1   Mar. 14, 2019

(51) Int. Cl.
*B60B 33/04* (2006.01)
*A45C 5/14* (2006.01)
*B60B 33/00* (2006.01)

(52) U.S. Cl.
CPC .............. *B60B 33/045* (2013.01); *A45C 5/14* (2013.01); *A45C 5/141* (2013.01); *A45C 2005/148* (2013.01); *B60B 33/0002* (2013.01)

(58) Field of Classification Search
CPC . B60B 33/045; B60B 33/0002; Y10T 16/212; Y10T 16/182; Y10T 16/186; Y10T 16/1867; Y10T 16/1873; Y10T 16/1847; Y10T 16/1887
See application file for complete search history.

(56) References Cited

U.S. PATENT DOCUMENTS

| | | | | |
|---|---|---|---|---|
| 408,595 A * | 8/1889 | Dion | ...................... | B60B 33/045 16/44 |
| 725,423 A * | 4/1903 | Dorsey | ............... | B60B 33/0002 16/22 |
| 4,649,595 A * | 3/1987 | Shane | ................. | B60B 33/0042 16/18 CG |
| 5,590,735 A * | 1/1997 | Cartier | .................. | B60B 33/045 16/19 |
| 7,950,108 B2 * | 5/2011 | Yang | .................... | B60B 33/0021 16/35 R |
| 8,020,679 B2 * | 9/2011 | Wu | ........................ | A45C 5/143 16/18 CG |

FOREIGN PATENT DOCUMENTS

CH                 344536 A  *  2/1960  ........... B60B 33/045

* cited by examiner

*Primary Examiner* — Victor D Batson
*Assistant Examiner* — Matthew J Sullivan
(74) *Attorney, Agent, or Firm* — Alan D. Kamrath; Mayer & Williams PC

(57) ABSTRACT

A castor assembly includes a base, a wheel unit and a rotation shaft. The wheel unit is located under the base and includes a pivot member, an elastic member biased and exposed between the base and the pivot member, and two rollers mounted on the pivot member. The rotation shaft is mounted between the base and the wheel unit and extends through the elastic member. The rotation shaft has a periphery provided with an operation slot. A positioning pin extends through the pivot member and is slidable in the operation slot of the rotation shaft. Thus, the elastic member is exposed outward so that the user clearly sees the elastic member and knows the shock-absorbing function provided by the elastic member.

5 Claims, 9 Drawing Sheets

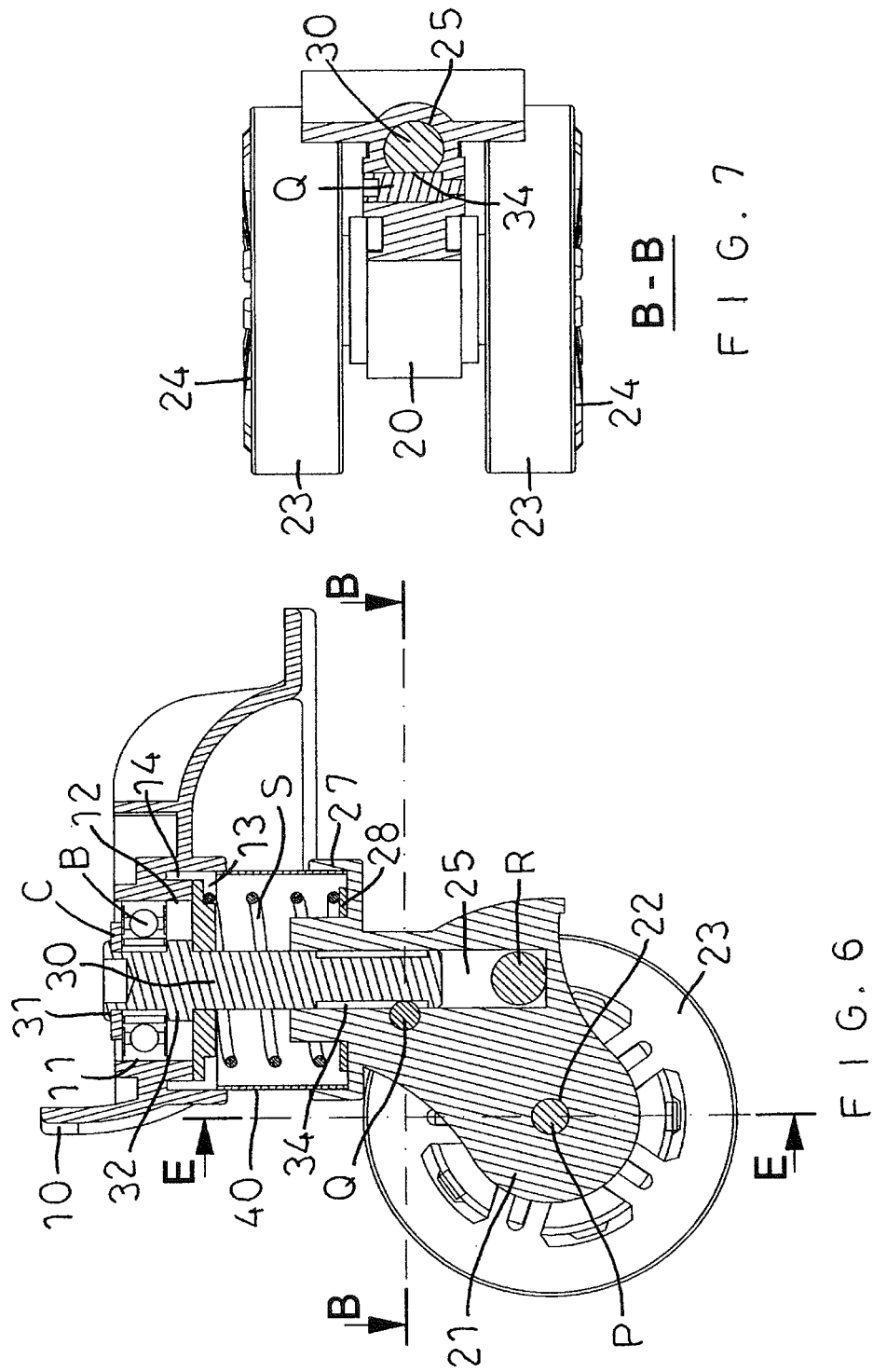

VISIBLE SPRING-BIASED CASTOR ASSEMBLY

BACKGROUND OF THE INVENTION

1. Field of the Invention

The present invention relates to a castor and, more particularly, to a castor assembly for a luggage.

2. Description of the Related Art

A conventional castor comprises a base mounted on the bottom of a luggage, a wheel unit located under the base and an elastic member mounted between the base and the wheel unit to provide a shock-absorbing function. However, the elastic member is hidden in the base and the wheel unit so that the consumer cannot see the shock-absorbing mechanism of the conventional castor, thereby causing inconvenience to the consumer when wishing to select the shock-absorbing mechanism.

BRIEF SUMMARY OF THE INVENTION

The primary objective of the present invention is to provide a spring-biased castor assembly whose shock-absorbing mechanism is visible.

In accordance with the present invention, there is provided a castor assembly comprising a base, a wheel unit and a rotation shaft. The base has a top provided with an upper recess and a bottom provided with a lower recess. The base is provided with a shaft hole located between the upper recess and the lower recess. A bearing is mounted in the upper recess of the base. An upper washer is received in the lower recess of the base and rests on the base. The wheel unit is located under the base and includes a pivot member having an upper end provided with a spring support, an elastic member biased between the upper washer and the spring support and exposed between the base and the pivot member, and two rollers mounted on the pivot member. The pivot member is provided with an axial hole and a radial hole. The rotation shaft extends through the upper washer and the elastic member. The rotation shaft has a lower end extending into the axial hole of the pivot member and an upper end extending through and rotatably mounted in the bearing of the base. The rotation shaft has a periphery provided with an operation slot. A positioning pin extends through the radial hole of the pivot member and extends into the operation slot of the rotation shaft. The positioning pin is slidable in the operation slot of the rotation shaft.

According to the primary advantage of the present invention, the elastic member is exposed between the base and the pivot member, and the transparent cover surrounds the elastic member, so that the elastic member is visible to attract the consumer, so that the user clearly sees the elastic member and knows the shock-absorbing function provided by the wheel unit, thereby facilitating the consumer selecting the castor assembly for the luggage.

According to another advantage of the present invention, the elastic member is visible clearly so that when the elastic member is worn out during a long-term utilization, the user can repair or replace the elastic member instantly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 6 is a cross-sectional view of the castor assembly in accordance with the preferred embodiment of the present invention.

FIG. 7 is a cross-sectional view of the castor assembly taken along line B-B as shown in FIG. 6.

DETAILED DESCRIPTION OF THE INVENTION

Figure 1:
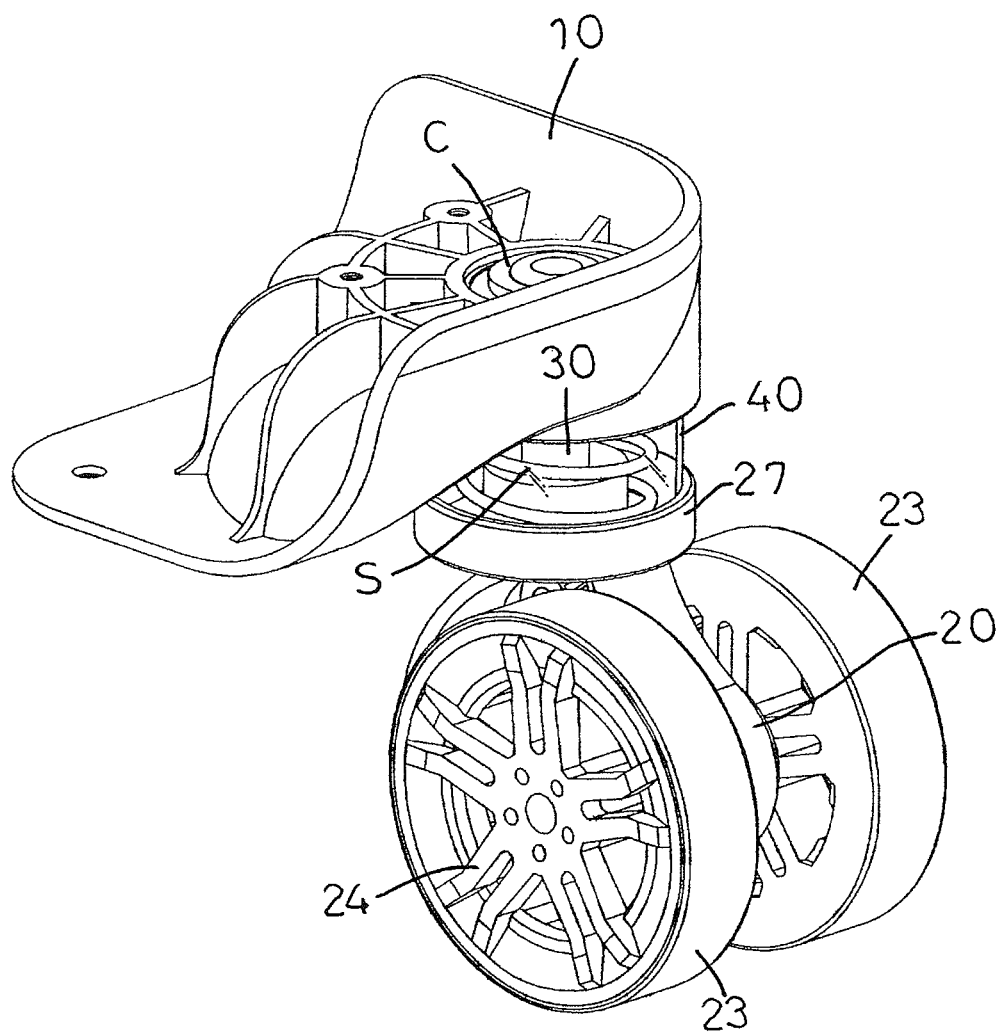
FIG. 1 is a perspective view of a castor assembly in accordance with the preferred embodiment of the present invention.
Figure 2:
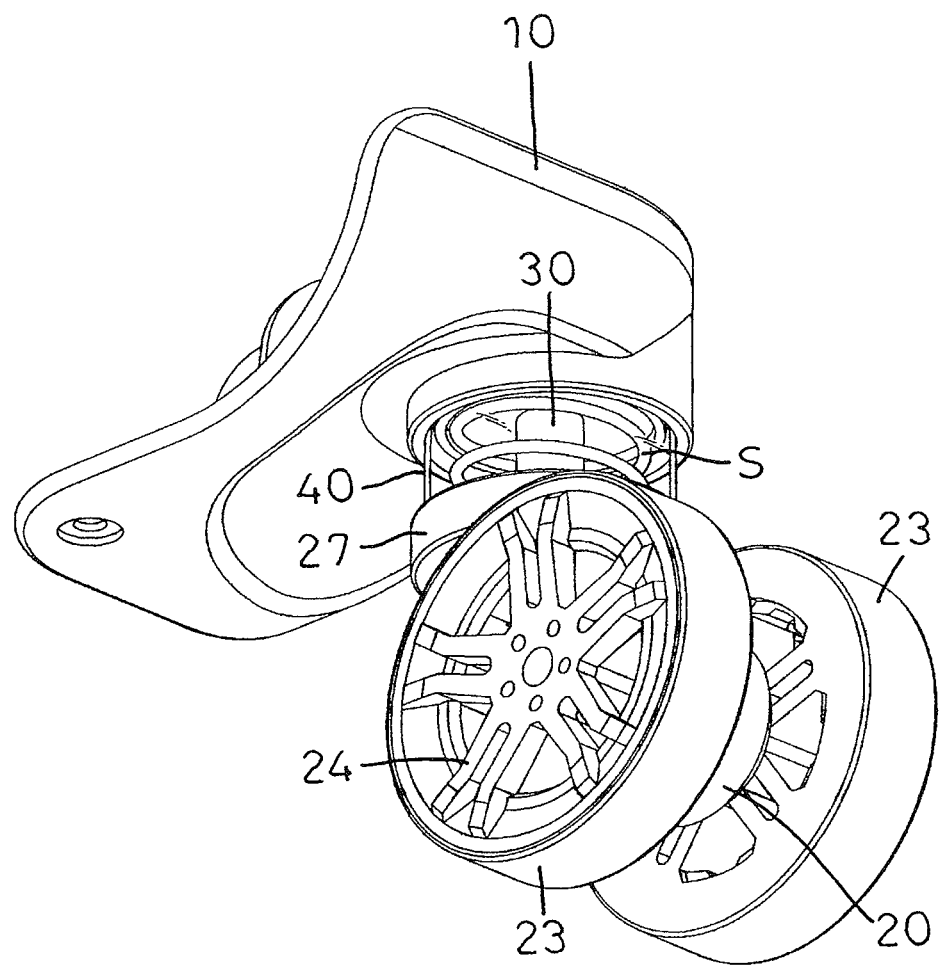
FIG. 2 is another perspective view of the castor assembly in accordance with the preferred embodiment of the present invention.
Figure 3:
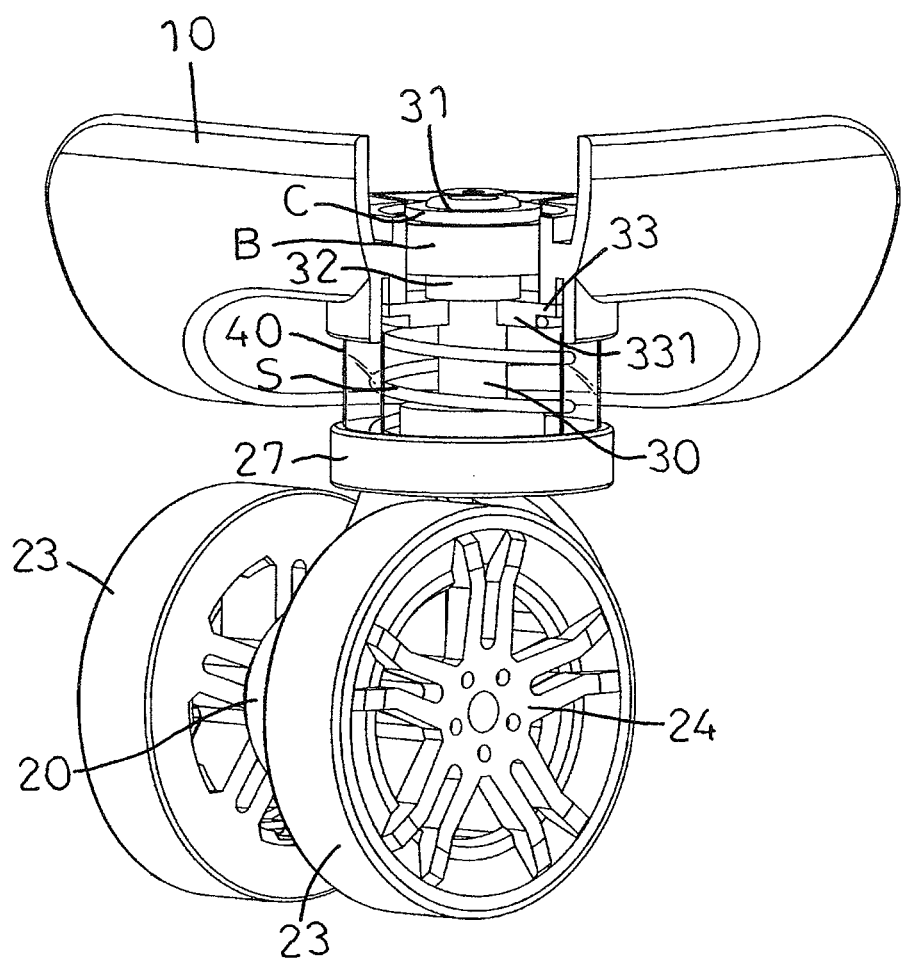
FIG. 3 is a partially perspective cross-sectional view of the castor assembly in accordance with the preferred embodiment of the present invention.
Figure 4:
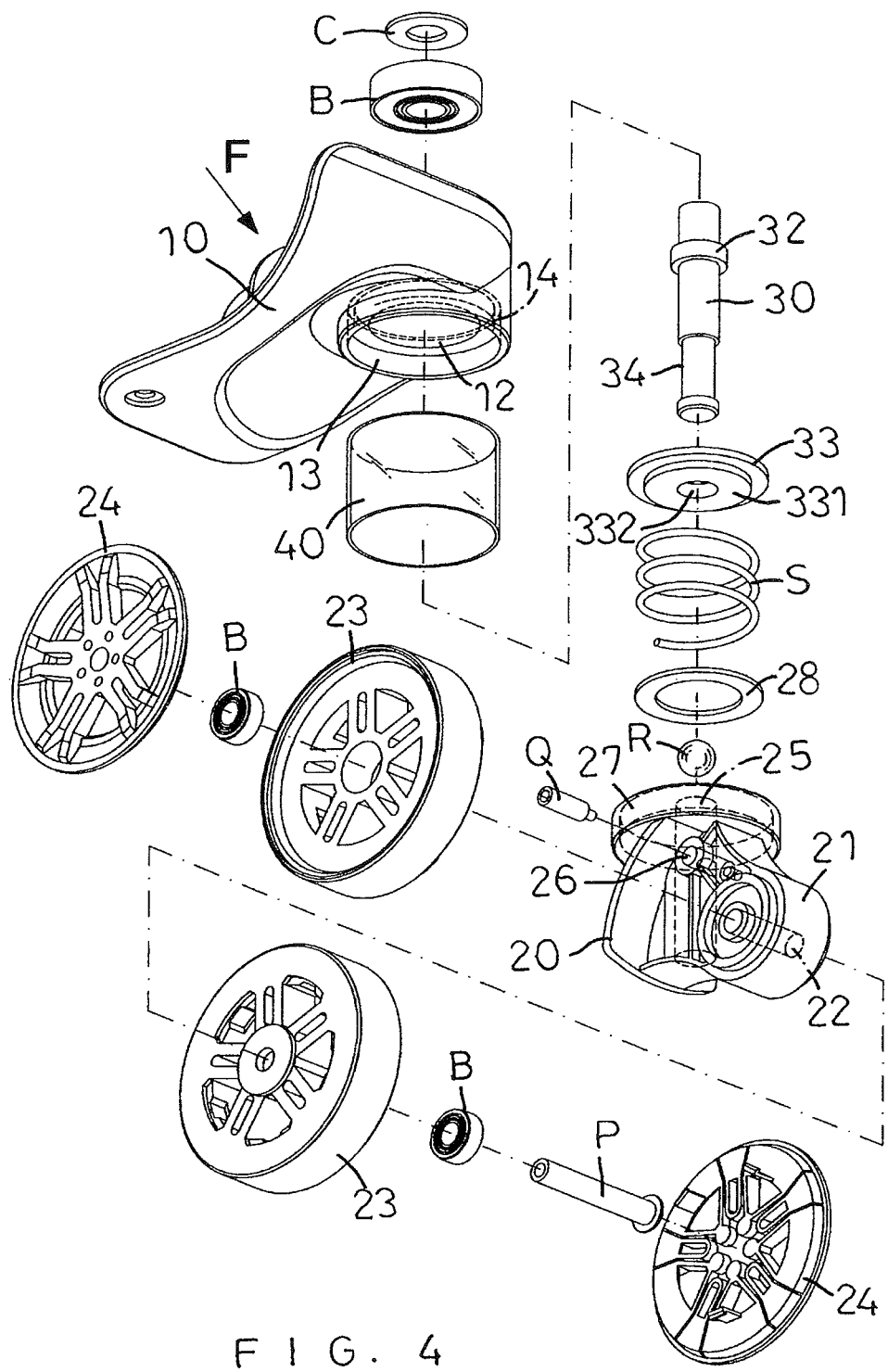
FIG. 4 is an exploded perspective view of the castor assembly in accordance with the preferred embodiment of the present invention.
Figure 5:
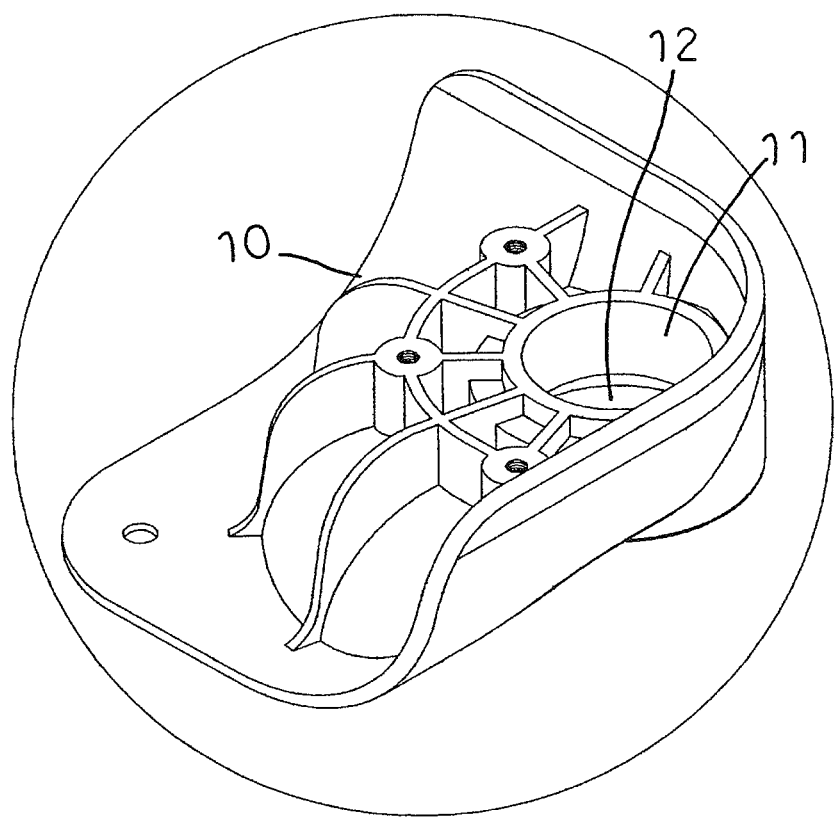
FIG. 5 is an enlarged view of a base of the castor assembly taken along the arrow "F" as shown in FIG. 4.
Figure 8:
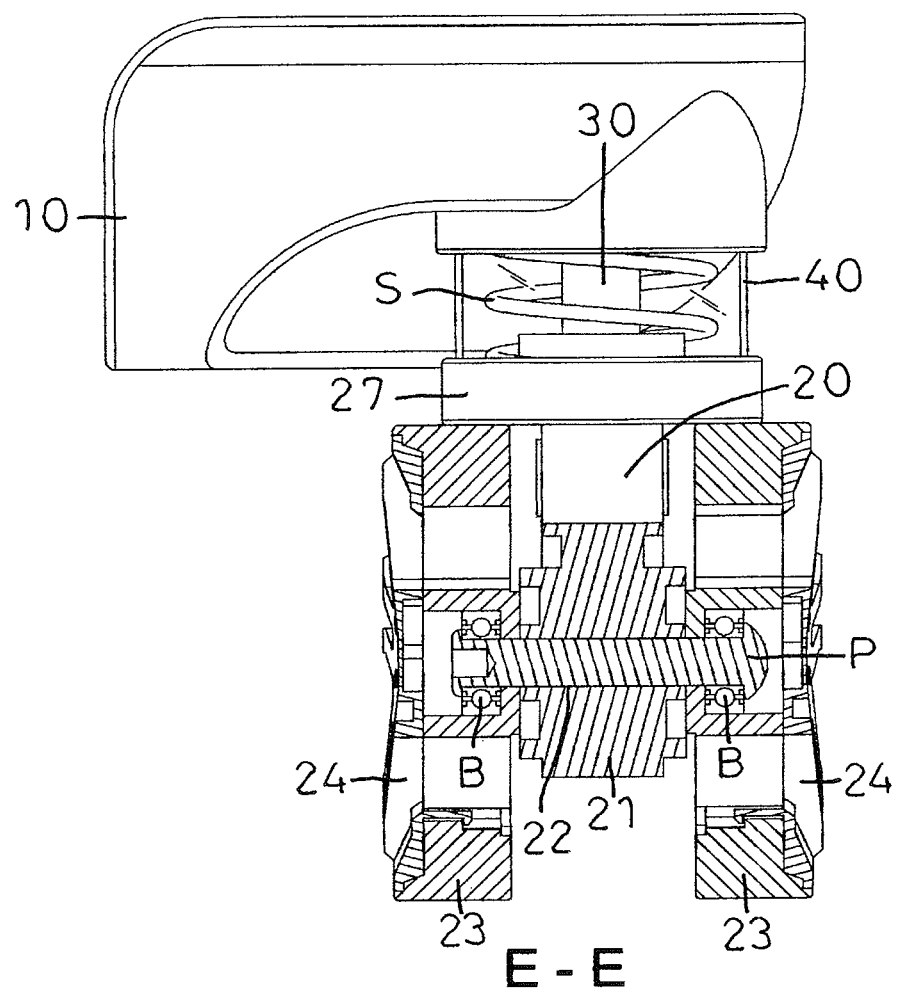
FIG. 8 is a cross-sectional view of the castor assembly taken along line E-E as shown in FIG. 6.

Referring to the drawings and initially to FIGS. 1-8, a castor assembly in accordance with the preferred embodiment of the present invention comprises a base 10, a wheel unit 20 and a rotation shaft 30.

The base 10 has a top provided with an upper recess 11 and a bottom provided with a lower recess 13. The base 10 is provided with a shaft hole 12 located between the upper recess 11 and the lower recess 13. A bearing "B" is mounted in the upper recess 11 of the base 10. An upper washer 33 is received in the lower recess 13 of the base 10 and rests on the base 10.

The wheel unit 20 is located under the base 10 and includes a pivot member 21 having an upper end provided with a substantially U-shaped spring support 27, an elastic member "S" biased between the upper washer 33 and the spring support 27 and exposed between the base 10 and the pivot member 21, and two rollers 23 mounted on the pivot member 21. The pivot member 21 is provided with an axial hole 25 and a radial hole 26. The radial hole 26 extends through the pivot member 21 and is connected to the axial hole 25.

The rotation shaft 30 is mounted between the base 10 and the wheel unit 20. The rotation shaft 30 extends through the upper washer 33 and the elastic member "S". The rotation shaft 30 has a lower end extending into the axial hole 25 of the pivot member 21 and an upper end extending through and rotatably mounted in the bearing "B" of the base 10, so that the rotation shaft 30 is rotated freely in the bearing "B" of the base 10. The upper end of the rotation shaft 30 is provided with a groove 31 by riveting, and a retaining ring "C" is mounted in the groove 31 of the rotation shaft 30. The rotation shaft 30 has a periphery provided with an elongate operation slot 34 extending longitudinally.

The upper washer 33 is located above the spring support 27. The upper washer 33 has a center provided with a shaft bore 332 having an inner diameter greater than an outer diameter of the rotation shaft 30, so that the upper washer 33 is not moved in concert with the rotation shaft 30. The upper washer 33 presses the base 10 closely by an elastic force of the elastic member "S", to guide and support the rotation shaft 30, thereby preventing the rotation shaft 30 from being bent or deformed. A positioning pin "Q" extends through the radial hole 26 of the pivot member 21 and extends into the operation slot 34 of the rotation shaft 30 so that when the pivot member 21 is moved on the rotation shaft 30 upward and downward by the elastic force of the elastic member "S", the positioning pin "Q" slides in the operation slot 34 of the rotation shaft 30 upward and downward.

In the preferred embodiment of the present invention, the pivot member 21 is provided with a pivot hole 22, and a pin "P" extends through the two rollers 23 and the pivot hole 22 of the pivot member 21. Each of the two rollers 23 is rotatably mounted on the pin "P" by a bearing "B" and has a side provided with a wheel cap 24.

In the preferred embodiment of the present invention, the rotation shaft 30 is provided with a flange 32 resting on the bearing "B" of the base 10, with the bearing "B" of the base 10 being sandwiched between the retaining ring "C" and the flange 32 of the rotation shaft 30. The upper washer 33 has a top resting on the flange 32 of the rotation shaft 30.

In the preferred embodiment of the present invention, the upper washer 33 is substantially T-shaped and is provided with a lug 331 for mounting an upper end of the elastic member "S". The wheel unit 20 further includes a lower washer 28 mounted on the spring support 27 and resting on a lower end of the elastic member "S", with the elastic member "S" biased between the upper washer 33 and the lower washer 28.

In the preferred embodiment of the present invention, the castor assembly further comprises a transparent cover 40 mounted between the lower recess 13 of the base 10 and the spring support 27 of the pivot member 21 and surrounding the elastic member "S" to provide a dustproof function. The lower recess 13 of the base 10 has an inner wall provided with a receiving space 14 extending upward. The transparent cover 40 has an upper end mounted in the receiving space 14 of the base 10 and a lower end resting on the spring support 27. The receiving space 14 of the base 10 allows upward and downward movement of the transparent cover 40. In use, when the elastic member "S" is compressed or expanded, the transparent cover 40 is moved upward or downward in the receiving space 14 of the base 10, to provide a dustproof function and to prevent the water, sand and dust from entering the elastic member "S".

In the preferred embodiment of the present invention, the wheel unit 20 further includes a steel ball "R" mounted in the axial hole 25 of the pivot member 21. When the pivot member 21 of the wheel unit 20 is moved upward relative to the rotation shaft 30, the steel ball "W" rests on the lower end of the rotation shaft 30 to restrict the maximum upward movement distance of the wheel unit 20.

Figure 9:
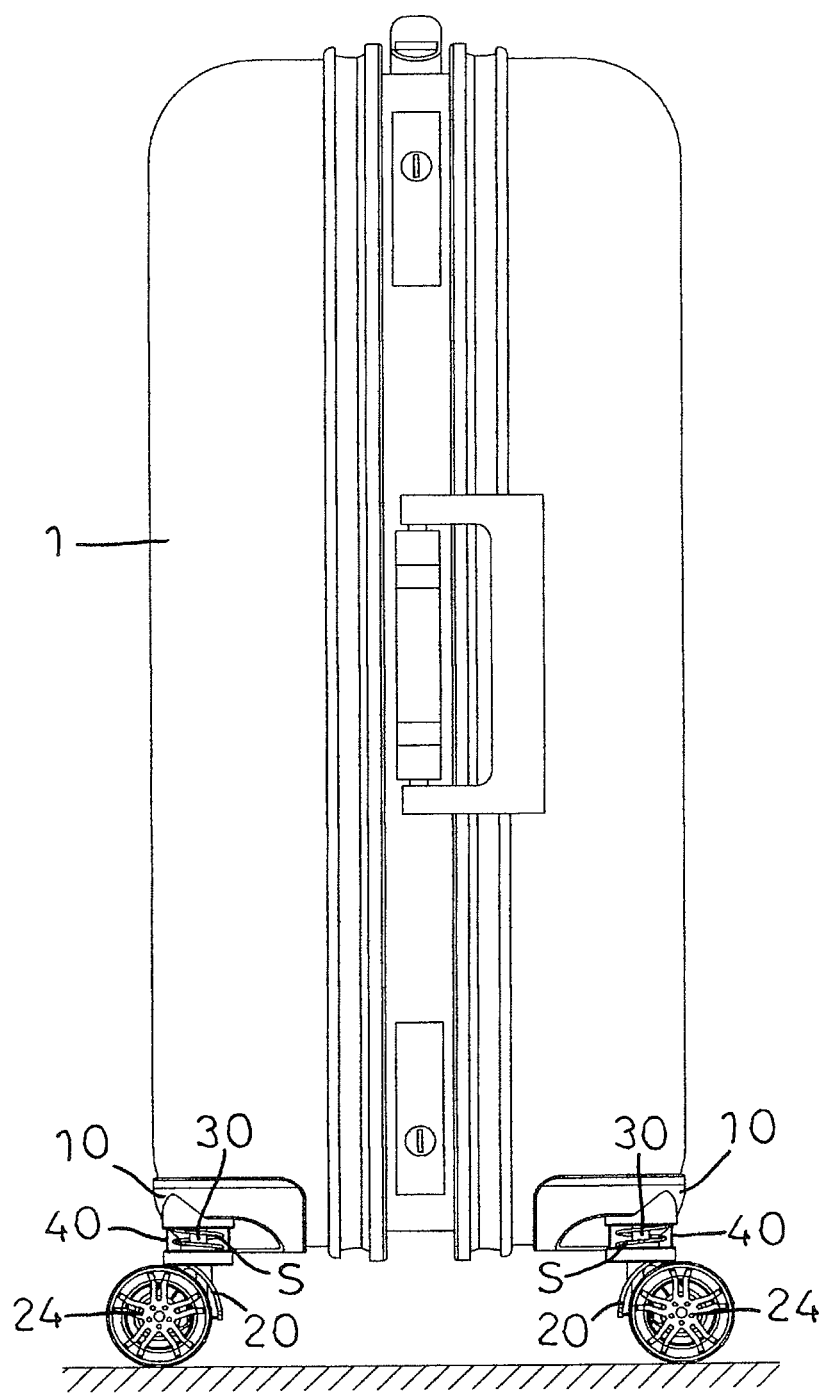
FIG. 9 is a schematic planar view of the castor assembly for a luggage.
Figure 10:
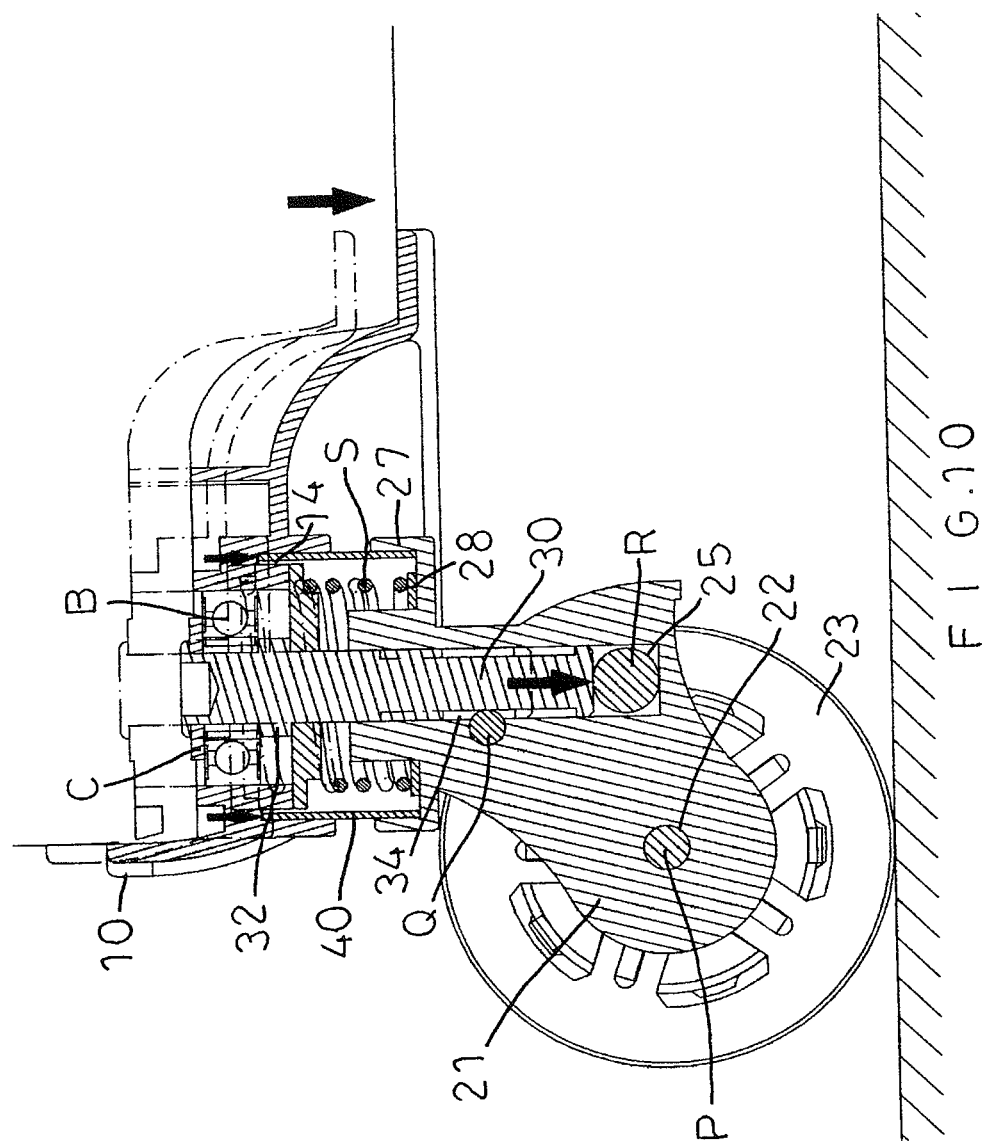
FIG. 10 is a schematic operational view of the castor assembly as shown in FIG. 6 in use.

In operation, referring to FIGS. 9 and 10 with reference to FIGS. 1-8, the castor assembly is mounted on a luggage 1. When the luggage 1 is moved, the elastic member "S" is biased between the base 10 and the wheel unit 20 to provide a shock-absorbing function to the luggage 1. At this time, the positioning pin "Q" slides in the operation slot 34 of the rotation shaft 30 upward and downward by the elastic force of the elastic member "S", so that when the pivot member 21 of the wheel unit 20 is moved upward relative to the rotation shaft 30 (or the rotation shaft 30 is moved downward relative to the pivot member 21 of the wheel unit 20), the steel ball "R" is moved upward to rest on the lower end of the rotation shaft 30 (or the lower end of the rotation shaft 30 is moved downward to rest on the steel ball "R") to restrict the maximum upward movement distance of the wheel unit 20.

Accordingly, the elastic member "S" is exposed between the base 10 and the pivot member 21, and the transparent cover 40 surrounds the elastic member "S", so that the elastic member "S" is visible to attract the consumer, so that the user clearly sees the elastic member "S" and knows the shock-absorbing function provided by the wheel unit 20, thereby facilitating the consumer selecting the castor assembly for the luggage 1. In addition, the elastic member "S" is visible clearly so that when the elastic member "S" is worn out during a long-term utilization, the user can repair or replace the elastic member "S" instantly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A castor assembly comprising:
a base, a wheel unit and a rotation shaft;
wherein:
the base has a top provided with an upper recess and a bottom provided with a lower recess;
the base is provided with a shaft hole located between the upper recess and the lower recess;
a bearing is mounted in the upper recess of the base;
an upper washer is received in the lower recess of the base and rests on the base;
the wheel unit is located under the base and includes:
a pivot member having an upper end provided with a spring support;
an elastic member biased between the upper washer and the spring support and exposed between the base and the pivot member; and
two rollers mounted on the pivot member;
the pivot member is provided with an axial hole and a radial hole;
the rotation shaft extends through the upper washer and the elastic member;
the rotation shaft has a lower end extending into the axial hole of the pivot member and an upper end extending through and rotatably mounted in the bearing of the base;
the rotation shaft has a periphery provided with an operation slot;
a positioning pin extends through the radial hole of the pivot member and extends into the operation slot of the rotation shaft;
the positioning pin is slidable in the operation slot of the rotation shaft;
the upper washer is provided with a shaft bore having an inner diameter greater than an outer diameter of the rotation shaft, so that the upper washer is not moved in concert with the rotation shaft;
the upper washer is provided with a lug for mounting an upper end of the elastic member; and
the wheel unit further includes a lower washer mounted on the spring support and resting on a lower end of the elastic member, with the elastic member biased between the upper washer and the lower washer.

2. The castor assembly of claim 1, wherein:
the pivot member is provided with a pivot hole;
a pin extends through the two rollers and the pivot hole of the pivot member; and
each of the two rollers is rotatably mounted on the pin and has a side provided with a wheel cap.

3. The castor assembly of claim 1, wherein:
the upper end of the rotation shaft is provided with a groove;
a retaining ring is mounted in the groove of the rotation shaft;
the rotation shaft is provided with an flange resting on the bearing of the base, with the bearing of the base being sandwiched between the retaining ring and the flange of the rotation shaft;
the upper washer has a top resting on the flange of the rotation shaft; and
the upper washer presses the base by an elastic force of the elastic member.

4. A castor assembly comprising:
a base, a wheel unit and a rotation shaft;
wherein:
the base has a top provided with an upper recess and a bottom provided with a lower recess;
the base is provided with a shaft hole located between the upper recess and the lower recess;
a bearing is mounted in the upper recess of the base;
an upper washer is received in the lower recess of the base and rests on the base;
the wheel unit is located under the base and includes:
a pivot member having an upper end provided with a spring support;
an elastic member biased between the upper washer and the spring support and exposed between the base and the pivot member; and
two rollers mounted on the pivot member;
the pivot member is provided with an axial hole and a radial hole;
the rotation shaft extends through the upper washer and the elastic member;
the rotation shaft has a lower end extending into the axial hole of the pivot member and an upper end extending through and rotatably mounted in the bearing of the base;
the rotation shaft has a periphery provided with an operation slot;
a positioning pin extends through the radial hole of the pivot member and extends into the operation slot of the rotation shaft;
the positioning pin is slidable in the operation slot of the rotation shaft;
the castor assembly further comprises a transparent cover mounted between the lower recess of the base and the spring support of the pivot member and surrounding the elastic member;
the lower recess of the base has an inner wall provided with a receiving space extending upward;
the transparent cover has an upper end mounted in the receiving space of the base and a lower end resting on the spring support;
the receiving space of the base allows upward and downward movement of the transparent cover; and
when the elastic member is compressed or expanded, the transparent cover is moved in the receiving space of the base.

5. The castor assembly of claim 1, wherein:
the wheel unit further includes a steel ball mounted in the axial hole of the pivot member; and
when the pivot member of the wheel unit is moved upward relative to the rotation shaft, the steel ball rests on the lower end of the rotation shaft.

\* \* \* \* \*